United States Patent
Luo et al.

(10) Patent No.: US 11,108,813 B2
(45) Date of Patent: *Aug. 31, 2021

(54) DYNAMIC RATE LIMITING FOR MITIGATING DISTRIBUTED DENIAL-OF-SERVICE ATTACKS

(71) Applicant: Microsoft Technology Licensing, LLC, Redmond, WA (US)

(72) Inventors: Shoufu Luo, San Jose, CA (US); Jie Zhang, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 208 days.

This patent is subject to a terminal disclaimer.

(21) Appl. No.: 16/457,737

(22) Filed: Jun. 28, 2019

(65) Prior Publication Data
US 2020/0412761 A1 Dec. 31, 2020

(51) Int. Cl.
*H04L 29/06* (2006.01)

(52) U.S. Cl.
CPC ...... *H04L 63/1458* (2013.01); *H04L 63/1425* (2013.01)

(58) Field of Classification Search
CPC .................... H04L 63/1458; H04L 63/1425
See application file for complete search history.

(56) References Cited

U.S. PATENT DOCUMENTS

| | | | | |
|---|---|---|---|---|
| 8,613,089 B1 * | 12/2013 | Holloway | ........... | H04L 63/1458 726/23 |
| 9,485,273 B2 * | 11/2016 | Karasaridis | ......... | G06F 9/45558 |
| 9,762,610 B1 * | 9/2017 | Kwan | ...................... | H04L 63/20 |
| 10,135,864 B2 * | 11/2018 | Kwan | ................. | H04L 63/1408 |
| 10,277,626 B2 * | 4/2019 | Chien | ................. | H04L 63/1408 |
| 10,425,443 B2 * | 9/2019 | Ronen | ................. | H04L 63/1416 |
| 10,516,695 B1 * | 12/2019 | Evans | ................. | H04L 63/1425 |
| 10,742,674 B1 * | 8/2020 | McLinden | ............ | H04L 63/105 |
| 10,911,483 B1 * | 2/2021 | Wasiq | ..................... | H04L 63/10 |
| 10,986,109 B2 * | 4/2021 | Howard | ............. | H04L 63/1458 |
| 2014/0047542 A1 * | 2/2014 | Holloway | ........... | H04L 63/0281 726/23 |
| 2016/0099964 A1 * | 4/2016 | Htay | ................... | H04L 63/1458 726/23 |
| 2016/0164911 A1 * | 6/2016 | Karasaridis | ......... | H04L 63/1425 726/23 |
| 2016/0337313 A1 * | 11/2016 | Wood | .................. | H04L 61/6022 |
| 2017/0310692 A1 * | 10/2017 | Ackerman | .......... | H04L 63/1425 |
| 2017/0310693 A1 * | 10/2017 | Howard | ................ | G06F 21/554 |

(Continued)

*Primary Examiner* — Joseph P Hirl
*Assistant Examiner* — Stephen T Gundry
(74) *Attorney, Agent, or Firm* — Hickman Becker Bingham Ledesma LLP

(57) ABSTRACT

The disclosed embodiments provide a system for mitigating a distributed denial-of-service (DDoS) attack. During operation, the system analyzes application layer data in historical traffic to an online system to determine a historical volume of member traffic from an Internet Protocol (IP) address to the online system, wherein the member traffic is generated by members of the online system. Next, the system calculates a rate limit for a set of requests from the IP address to the online system based on the historical volume of member traffic from the IP address. During a DDoS attack, the system outputs the rate limit for use in blocking a subset of the requests from the IP address to the online system.

20 Claims, 4 Drawing Sheets

(56) References Cited

U.S. PATENT DOCUMENTS

| | | | |
|---|---|---|---|
| 2017/0310703 A1* | 10/2017 | Ackerman | H04L 63/1425 |
| 2017/0359372 A1* | 12/2017 | Ronen | H04L 63/1458 |
| 2018/0084006 A1* | 3/2018 | Kwan | H04L 63/1416 |
| 2018/0131718 A1* | 5/2018 | Chien | H04L 63/101 |
| 2020/0106806 A1* | 4/2020 | Gupta | H04L 63/1416 |
| 2020/0259860 A1* | 8/2020 | Adams | H04L 63/1408 |
| 2020/0412760 A1 | 12/2020 | Luo et al. | |

* cited by examiner

DYNAMIC RATE LIMITING FOR MITIGATING DISTRIBUTED DENIAL-OF-SERVICE ATTACKS

RELATED APPLICATION

The subject matter of this application is related to the subject matter in a co-pending non-provisional application filed on the same day as the instant application, entitled "Region-Based Prioritization for Mitigating Distributed Denial-of-Service Attacks," having Ser. No. 16/457,734, and filing date Jun. 28, 2019.

BACKGROUND

Field

The disclosed embodiments relate to incident response. More specifically, the disclosed embodiments relate to dynamic rate limiting for mitigation of distributed denial-of-service (DDoS) attacks.

Related Art

Incident response techniques are commonly used to address and manage attacks such as security breaches, fake user accounts, spamming, phishing, account takeovers, scraping, and/or other types of malicious or undesired user activity. For example, an organization includes an incident response team and/or incident response system that identifies, responds to, escalates, contains, and/or recovers from security incidents. The organization also analyzes past incidents to obtain insights related to responding to and/or preventing similar types of activity in the future. Consequently, the negative impact of security incidents may be reduced by quickly and effectively detecting, adapting to, and responding to malicious activity within Information Technology (IT) infrastructures.

BRIEF DESCRIPTION OF THE FIGURES

In the figures, like reference numerals refer to the same figure elements.

DETAILED DESCRIPTION

Figure 1:
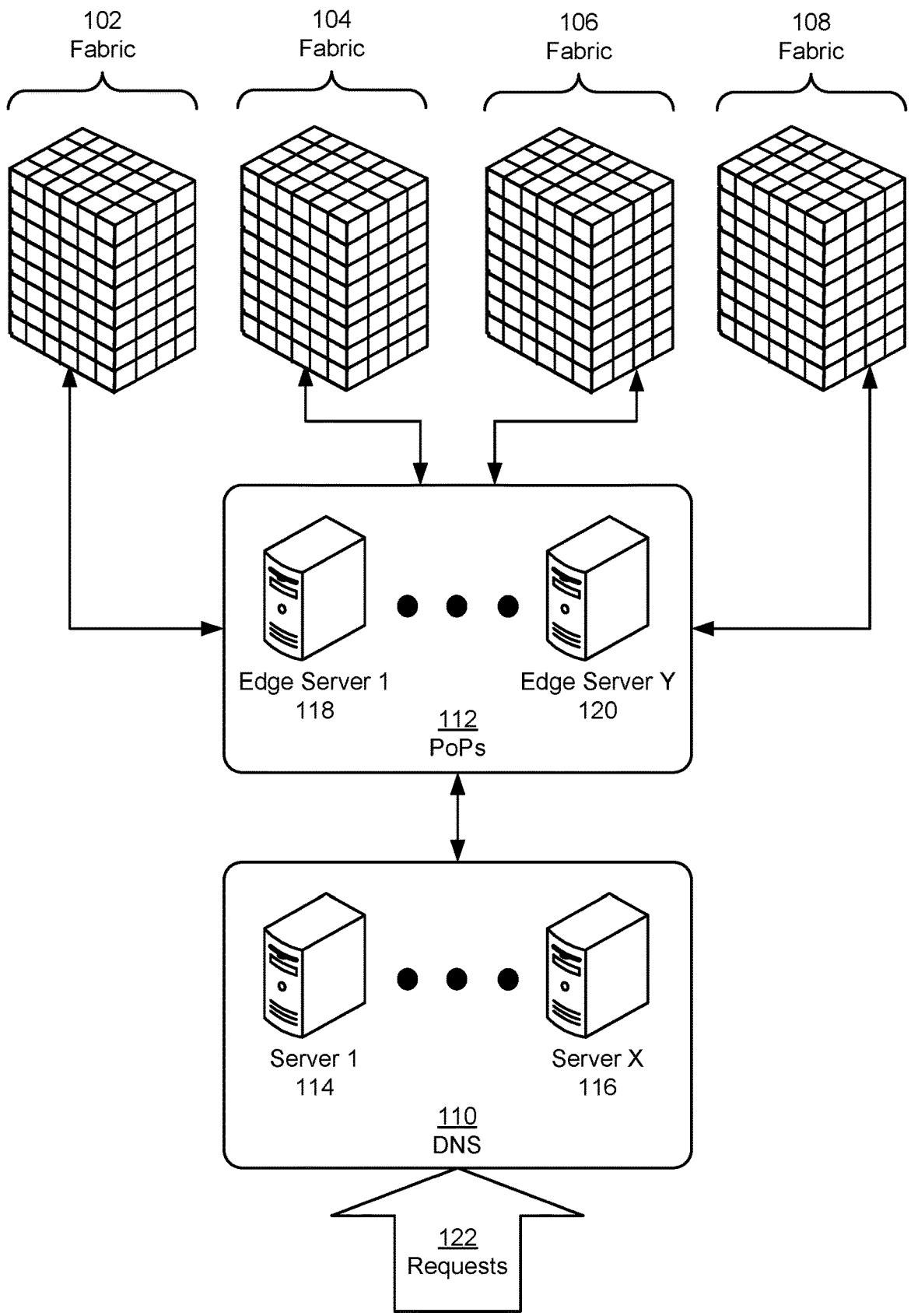
FIG. 1 shows a schematic of a system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The disclosed embodiments relate to a method, apparatus, and system for mitigating distributed denial-of-service (DDoS) attacks. For example, the disclosed embodiments are used to handle application layer DDoS attacks, such as request floods, resource exhaustion, and/or large POST requests from multiple distributed sources that aim to bring down specific servers, services, and/or hosts in an online system.

More specifically, the disclosed embodiments provide a method, apparatus, and system for enforcing limits on incoming requests during DDoS attacks. A denial-of-service (DoS) attack is detected as an increase in query rate beyond a query rate threshold for one or more services in the online system. For example, the query rate threshold for a given service is set to a value representing the service's capacity to handle incoming queries. When the incoming queries per second (QPS) to the service reaches or exceeds the query rate threshold, a potential DoS attack is detected. When the increase in QPS originates from multiple sources, a potential DDoS attack is detected.

In turn, a potential DDoS attack is handled or mitigated by enforcing limits on query rates to the online system based on historical proportions of queries that are associated with "trusted" sources. In some embodiments, trusted sources of requests include members of the online system, such as users with registered accounts on the online system. In these embodiments, the online system includes defenses against registering fake accounts with the online system, which significantly increases the difficulty of forging member traffic to the online system. Conversely, non-trusted sources include non-members or "guests" that access the online system without registering or authenticating with the online system. Because guest traffic to the online system does not trigger the same defenses as member traffic, attackers are much more likely to utilize guest traffic in DDoS attacks to the online system.

To prevent a potential DDoS attack from bringing down services, endpoints, and/or hosts, a rate limit is calculated for incoming requests to the online system from each Internet Protocol (IP) address based on a historical volume of requests containing the IP address from trusted sources (e.g., members of the online system). For example, the rate limit represents a QPS limit for incoming requests from each IP address to the online system. The rate limit is calculated as a function of the number of members associated with recent requests (e.g., requests received over a previous number of days or weeks) from the IP address to the online system, a growth rate associated with the number of members at the IP address, and/or a pattern associated with the number of members accessing the online system from the IP address over time.

The rate limit is then enforced by blocking a subset of requests from the IP address to the online system during a detected DDoS attack. For example, the rate limit is enforced by points of presence (PoPs) for the online system, data centers on which services in the online system execute, and/or other components of the online system. To enforce the rate limit, the components determine a sampling rate based on the rate limit and an estimated QPS from the IP address to the online system. The components then apply the sampling rate to requests from the IP address to the online system so that a proportion of the requests is randomly sampled at the sampling rate and blocked.

By establishing rate limits for requests from different IP addresses based on historical proportions of the requests from members of the online system, the disclosed embodiments handle DDoS attacks by blocking higher proportions of requests from locations that historically lack trusted member traffic. Conversely, the disclosed embodiments selectively allow higher numbers of requests to be processed by the online system when the requests are from locations that historically have higher volumes of trusted member traffic. The disclosed embodiments thus mitigate DDoS attacks by keeping incoming requests below capacity limits for the online system and/or services executing in the online system while prioritizing requests that are more likely to come from trusted sources. In turn, malicious traffic is prevented from taking down the online system and/or services, and the online system is able to continue processing significant volumes of legitimate traffic during potential DDoS attacks.

In contrast, conventional techniques for mitigating DDoS attacks lack the ability to access encrypted data in higher layers of the network stack, such as identifiers, tokens, or other fields that can be used to distinguish between member traffic and non-member traffic to an online system. Instead, these techniques handle DDoS attacks based on information in lower layers (e.g., physical, data link, network, transport) of the network stack. As a result, these techniques are less capable of distinguishing malicious traffic from legitimate traffic during application-layer DDoS attacks, which reduces the effectiveness of the techniques and/or causes large volumes of legitimate traffic to be blocked. In turn, the DDoS attacks are more likely to bring down and/or disrupt legitimate traffic to systems that are guarded using conventional technique. Consequently, the disclosed embodiments improve computer systems, applications, tools, and/or technologies related to mitigating DDoS attacks, capacity monitoring, and/or managing or maintaining distributed services or systems.

Dynamic Rate Limiting for Mitigating DDoS Attacks

FIG. 1 shows a schematic of a system in accordance with the disclosed embodiments. As shown in FIG. 1, the system includes an online system that processes incoming requests 122 using edge servers (e.g., edge server 1 118, edge server y 120) in multiple globally distributed points of presence (PoPs) 112 and a set of fabrics 102-108 connected to PoPs 112.

Fabrics 102-108 are found in data centers, collocation centers, cloud computing systems, clusters, content delivery networks, and/or other collections of network-enabled devices or computer systems. Resources in and across fabrics 102-108 are connected to one another over a local area network (LAN), wide area network (WAN), personal area network (PAN), virtual private network, intranet, mobile phone network (e.g., a cellular network), Wi-Fi network (Wi-Fi® is a registered trademark of Wi-Fi Alliance), Bluetooth (Bluetooth® is a registered trademark of Bluetooth SIG, Inc.) network, universal serial bus (USB) network, Ethernet network, switch fabric, and/or another type of network. The resources include processors, memory, storage, network, I/O, and/or other types of hardware provided by data center and/or computing fabrics 102-108.

In some embodiments, each fabric hosts a number of services, with each service implemented and/or accessed using a number of service endpoints. For example, a set of services for implementing one or more applications, websites, features, e-commerce platforms, and/or online networks are deployed in and/or replicated across fabrics 102-108. Each service includes tens to hundreds of service endpoints that can be accessed using different Uniform Resource Locators (URLs), network addresses, and/or other types of references. Each service endpoint additionally executes on multiple physical and/or virtual hosts in a given fabric.

Edge servers in PoPs 112 forward requests 122 to fabrics 102-108. More specifically, incoming requests 112 (e.g., HyperText Transfer Protocol (HTTP) requests) to the online system are initially processed by a set of servers (e.g., server 1 114, server x 116) that perform Domain Name System (DNS) 110 resolution of domain names in requests 112. Each server in DNS 110 responds to a request with a domain name of the online system with an Internet Protocol (IP) address of a PoP for the online system, such as the IP address of the PoP that is geographically closest to the user or device from which the request was received. An edge server in the PoP then forwards the request to a fabric, where the request is processed using a series of calls to a number of interconnected services and/or service endpoints that implement the functionality of the online system.

In one or more embodiments, the online system includes an online professional network, social network, or other community that allows a set of entities to interact with one another in a professional, social, commercial, and/or business context. For example, the entities include users that use an online network to establish and maintain professional connections, list work and community experience, endorse and/or recommend one another, search and apply for jobs, and/or perform other actions. The entities also include companies, employers, and/or recruiters that use the online network to list jobs, search for potential candidates, provide business-related updates to users, advertise, and/or take other action. The entities further include guests that are not registered members of the online network and thus have restricted access to the online network.

As a result, requests 122 to the online system include requests from registered members of the online system, which have user accounts and/or profiles with the online system. These requests 122 include member identifiers (IDs), tokens, and/or other encrypted data representing the corresponding members at the application layer of the network stack. Requests 112 also include requests from non-members of the online system, which lack attributes associated with members of the online system at the application layer of the network stack.

Figure 2:
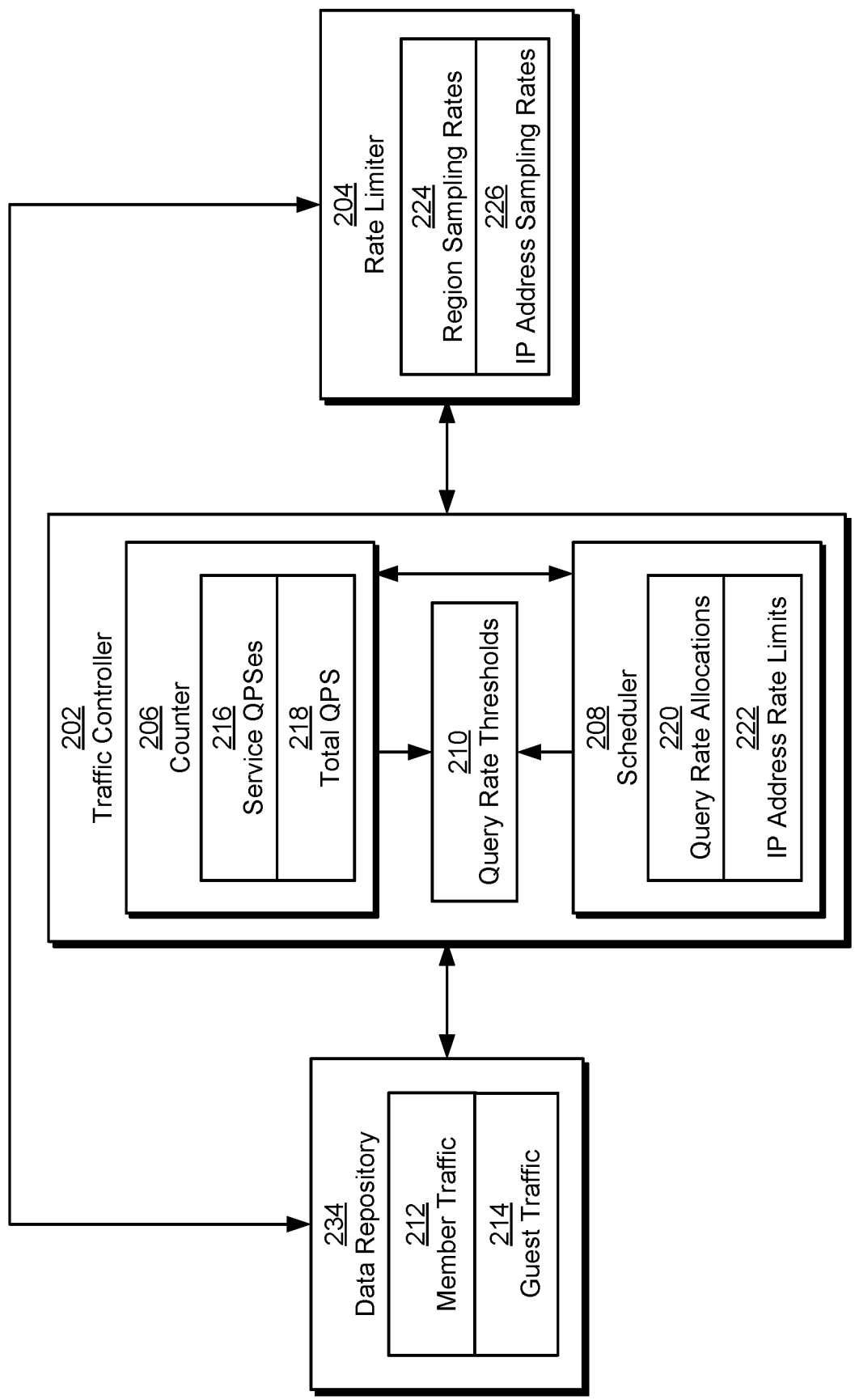
FIG. 2 shows a system for mitigating a distributed denial-of-service (DDoS) attack in accordance with the disclosed embodiments.

In one or more embodiments, the online system includes functionality to mitigate DDoS attacks based on historical traffic or requests 122 associated with members and non-members of the online system. As shown in FIG. 2, a system for mitigating a DDoS attack includes a traffic controller 202 and a rate limiter 204. Each of these components is described in further detail below.

Traffic controller 202 includes a counter 206 that analyzes traffic to an online system (e.g., the online system of FIG. 1) for potential DDoS attacks. Traffic controller 202 also includes a scheduler 208 that determines a plan for processing traffic to the online system during DDoS attacks. In turn, the plan is executed by a rate limiter 204 that drops a portion of the traffic during a potential DDoS attack.

In one or more embodiments, traffic controller 202 and rate limiter 204 execute in various portions or components of the online system. For example, instances of traffic controller 202 execute in one or more fabrics (e.g., fabrics 102-108 of FIG. 1) that contain services and/or service endpoints in the online system. As a result, traffic controller 202 is able to monitor traffic to the online system from various IP addresses, subnets, regions, and/or locations. Instances of rate limiter 204 are deployed in PoPs for the online system to block traffic before the traffic reaches the fabrics and/or services running in the fabrics.

In some embodiments, counter 206 continuously estimates query rates associated with one or more services in the online system. The query rates include a total queries per second (QPS) 218 for the online system, as well as service QPSes 216 for individual services in the online system. To estimate total QPS 218, counter 206 counts the total number of requests to the online system over a time period and divides the total number of requests by the number of seconds in the time period. To estimate a service QPS for a given service, counter 206 counts requests to the service and/or requests that result in calls to the service over a time period and divides the counted requests by the number of seconds in the time period.

Counter 206 also compares service QPSes 216 and total QPS 218 to query rate thresholds 210 for the corresponding services and/or the online system. In some embodiments, query rate thresholds 210 include limits to the query-processing capacities of the services and/or online system. For example, counter 206 and/or another component of the system determine a query rate threshold for a given service (or the online system) as a numeric QPS threshold for the service (or online system). The component calculates the QPS threshold based on a resource utilization, a service level agreement (SLA) limit (e.g., latency, processor utilization, memory utilization, etc.), a cost per request (e.g., in latency, processor utilization, and/or memory utilization), and/or other attributes associated with execution of the service (or online system). The component also, or instead, sets the QPS threshold to a certain percentage or proportion above a "baseline" QPS for the service (or online system). The component also, or instead, sets the QPS threshold to a proportion or percentage of a QPS that has historically caused significant latency, performance issues, and/or downtime in the service (or online system).

When an estimated QPS for a service (or the online system) exceeds a corresponding query rate threshold, traffic controller 202 detects a potential DDoS attack on the online system. In turn, scheduler 208 outputs query rate allocations 220 and IP address rate limits 222 that restrict the rates of subsequent requests to the service and/or online system. For example, scheduler 208 computes query rate allocations 220 and IP address rate limits 222 on an offline and/or periodic basis and stores query rate allocations 220 and IP address rate limits 222 in a data repository 234 and/or another data store. When a potential DDoS attack is detected by counter 206 and/or another component of traffic controller 202, scheduler 208 retrieves the latest query rate allocations 220 and IP address rate limits 222 from the data store. Scheduler 208 also, or instead, calculates and/or updates query rate allocations 220 and IP address rate limits 222 after receiving an alert or notification of the potential DDoS attack from counter 206 and/or another component of traffic controller 202. Scheduler 208 then provides query rate allocations 220 and IP address rate limits 222 to instances of rate limiter 204, and the instances use query rate allocations 220 and IP address rate limits 222 to block traffic during the potential DDoS attack.

In one or more embodiments, scheduler 208 determines query rate allocations 220 as allocations of QPSes to requests from different regions to the online system. In these embodiments, regions include Internet service providers (ISPs), countries, autonomous systems (ASes), and/or other representations of geographic areas from which traffic to the online system can originate. Scheduler 208 also determines IP address rate limits 222 as upper bounds to QPSes from different IP addresses to the online system.

As shown in FIG. 2, scheduler 208 uses historical member traffic 212 and guest traffic 214 from data repository 234 to determine query rate applications 220 and/or IP address rate limits 222. For example, scheduler 208 obtains packet contents, logs, aggregated metrics, time-series data, and/or other representations of historical member traffic 212 and guest traffic 214 from a relational database, data warehouse, filesystem, event stream, flat file, and/or another data store providing data repository 234 after member traffic 212 and guest traffic 214 are received by one or more components of the online system. In another example, scheduler 208 obtains metrics and/or statistics related to member traffic 212 and/or guest traffic 214 from counter 206 and/or another component as the traffic is detected by the component.

In one or more embodiments, member traffic 212 includes requests with application layer data that indicates that the requests come from members of the online system. For example, member traffic 212 includes requests with member IDs, access tokens, and/or other attributes of members with user accounts on the online system. On the other hand, guest traffic 214 includes requests that lack such attributes of members of the online system, such as requests from non-registered users or entities that lack user accounts with the online system. Because guest traffic 214 to the online system does not trigger the same defenses as member traffic 212 (e.g., defenses related to classifying and responding to security breaches, fake user accounts, account takeovers, spamming, phishing, scraping, etc.), attackers are much more likely to utilize guest traffic 214 in DDoS attacks to the online system.

In one or more embodiments, scheduler 208 calculates query rate allocations 220 for requests from different regions based on proportions and/or amounts of historical member traffic 212 and/or guest traffic 214 from the regions. Similarly, scheduler 208 calculates IP address rate limits 222 for requests from different IP addresses based on proportions and/or amounts of historical member traffic 212 and/or guest traffic 214 from the IP addresses. In these embodiments, query rate allocations 220 and IP address rate limits 222 are proportional to the amount of historical or recent member traffic 212 received from the corresponding regions and IP addresses.

In some embodiments, the operation of scheduler 208 in calculating query rate allocations 220 and IP address rate limits 222 is represented using the following example equations:

$$M = cG$$

$$B = xG$$

In the above equations, M represents the query-processing capacity of the online system and/or one or more components (e.g., services, service endpoints, hosts, etc.) of the online system, G represents the volume of "good" traffic (e.g., member traffic 212 or legitimate traffic) to the online system, and B represents the volume of "bad" traffic (e.g., malicious traffic) to the online system. M is obtained by multiplying G by a constant c, and a denial-of-service (DoS) attack occurs when $B+G>M$ or $x>c-1$. When a DoS attack includes malicious traffic from multiple distributed sources, a DDoS attack occurs.

In turn, the effectiveness of a defense against a DoS or DDoS attack can be measured using a survival rate S, which is obtained by dividing the volume of good traffic that is allowed through by the defense by the total volume of good traffic (i.e., G). In other words, an effective defense against a DoS or DDoS attack aims to increase or maximize the volume of good traffic that is allowed through to the online system while keeping the overall traffic volume processed by the online system and/or services in the online system below capacity limits for the online system and/or services.

Continuing with the above equations, scheduler 208, rate limiter 204, and/or another component of traffic controller 202 and/or the online system include functionality to respond to a DoS or DDoS attack by performing random sampling of requests. During random sampling, the component accepts or blocks requests at a sampling rate that accommodates the query-processing capacities of downstream services in the online system.

An example representation of random sampling includes the following:

$$R = \delta M/(B+G) = \delta c/(x+1)$$

In the above representation, R represents a sampling rate, which is a proportion of total traffic to one or more components of the online system, and $\delta$ represents a parameter for controlling the sampling rate (e.g., $\delta=0.9$). In this instance, the survival rate is calculated using the following:

$$S = \delta c/(x+1)$$

The component also includes functionality to customize the sampling rate to different regions from which the traffic is received. Continuing with the above equations and/or representations, good and bad traffic to the online system can be divided into a set of enumerated regions:

$B = \{B_1, B_2, \ldots, B_n\}$
$G = \{G_1, G_2, \ldots, G_n\}$ where n is the number of regions, $B_i$ represents the volume of bad traffic (e.g., in QPS) from the ith region, and $G_i$ represents the volume of good traffic (e.g., in QPS) from the ith region. The demand a of the ith region is composed of $B_i + G_i$, which represents the total volume of traffic (e.g., in QPS) from the region. Values of $B_i$ and $G_i$ can vary significantly across regions, as certain regions include large volumes of legitimate and/or member traffic 212 and/or effective defenses against attackers, while other regions include low volumes of legitimate and/or member traffic 212 and/or few defenses against attackers.

To improve the survival rate, a different weight is assigned to each region:

$w = \{w_1, w_2, \ldots, w_n\}$, where $\Sigma_i w_i = 1$

In some embodiments, the weight $w_i$ for a given region i represents the query rate allocation for the region, which is calculated as $w_i M$. In turn, the overall survival rate S for good traffic to the online system is calculated using the following:

$$S = \frac{1}{G} \cdot \sum_i \min\left(w_i M \frac{G_i}{B_i + G_i}, G_i\right)$$

In a scenario where every region is assigned an insufficient query rate allocation (i.e., $w_i M < B_i + G_i$), the overall survival rate is calculated using the following:

$$S = \frac{1}{G} \cdot \sum_i w_i M \frac{G_i}{B_i + G_i} = c \sum_i w_i \frac{G_i}{B_i + G_i}$$

When every region contains at least some good traffic (i.e., $G_i > 0$), the survival rate calculation becomes:

$$S = c \sum_i w_i \frac{1}{x_i + 1}$$

where $x_i$ represents the ratio of $B_i$ to $G_i$ for the ith region.

For $p = 1/(x_i + 1)$, the survival rate for the ith region is calculated as $w_i p$. If $x_i < 1$ and $p \in (\frac{1}{2}, 1]$, the ith region has more good traffic than bad traffic. If $x_i > 1$ and $p \in (0, \frac{1}{2})$, the ith region has more bad traffic than good traffic. If $x_i = 1$ and $p = \frac{1}{2}$, the ith region has the same amounts of good traffic and bad traffic. As a result, the survival rate is increased when a larger weight is assigned to a region with a higher proportion or volume of good traffic, as represented or indicated by member traffic 212 from the region.

For example, scheduler 208 assigns weight $w_i$ to the ith region based on the proportion of members that accessed the online system from the region over a given period (e.g., a previous number of days or weeks). Thus, a region with 200 members accessing the online system over the period out of 10,000 total members that have accessed the online system over the period is assigned a weight of 0.02, while a region with 1,000 members accessing the online system over the period out of the 10,000 total members is assigned a weight of 0.1.

In another example, scheduler 208 assigns weight $w_i$ to the ith region based on the proportion of total traffic from the region over a given period that is member traffic 212. As a result, a region with 10,000 requests from members over the period out of 1,000,000 total requests received over the period is assigned a weight of 0.01, while a region with 80,000 requests from members over the period out of the 1,000,000 total requests is assigned a weight of 0.08.

In one or more embodiments, scheduler 208 assigns query rate allocations 220 to regions in a way that achieves a weighted max-min fairness in query rate allocations 220. For example, scheduler 208 calculates a value $T = \delta M$ and normalizes the weights so that the smallest weight is 1. Scheduler 208 then calculates query rate allocations 220 (e.g., as allocations of QPSes) $A_i$ for the regions as "shares" of T that are proportional to the weights for the regions. Scheduler 208 then iteratively identifies regions with query rate allocations 220 that exceed the corresponding demands and reallocates excess query rate allocations 220 from the regions to regions with query rate allocations 220 that do not meet the corresponding demands.

An example weighted max-min fair calculation of query rate allocations 220 includes four regions with demands of 6,000, 3,000, 15,000 and 6,000 QPS and weights of 2.5, 4, 0.5 and 1, as well as a service with a total capacity of 30,000 QPS. Scheduler 208 multiplies the total capacity of 30,000 QPS by 8=0.8 to obtain a value of 24,000 QPS for T. Next, scheduler 208 normalizes the weights to obtain normalized weight values of 5, 8, 1, and 2 for the regions. Scheduler 208 sums the normalized weights to obtain 16 total "shares" of T to be allocated among the four regions, with each share representing 1,500 QPS to the service.

In a first round of query rate allocations 220, scheduler 208 assigns 5, 8, 1, and 2 shares of T to the four regions. The first region has a demand of 6,000 QPS, which is four shares of T, and thus is assigned one extra share of T. The second region has a demand of 3,000 QPS, which is two shares of T, and thus is assigned six extra shares of T. The third region is assigned one share of T that is equal to 1,500 QPS, which is lower than the region's demand of 15,000 QPS. The fourth region is assigned two shares of T that equal 3,000 QPS, which is lower than the region's demand of 6,000 QPS.

In a second round of query rate allocations 220, scheduler 208 reassigns seven shares of T that exceed the demands of the first and second regions to the third and fourth regions. Because the third region has a weight of 1 and the fourth region has a weight of 2, scheduler 208 initially assigns 7*⅓ shares to the third region and 7*⅔ shares to the fourth region. However, the fourth region's demand of four shares is lower than the 6.67 shares of T assigned to the fourth region. As a result, scheduler 208 reassigns the excess 2.67 shares to the third region in a third round of query rate allocations 220, which results in six total shares of T for the third region. In turn, the final query rate allocations 220 include four shares (i.e., 6,000 QPS) to the first region, two shares (i.e., 3,000 QPS) to the second region, six shares (i.e., 9,000 QPS) to the third region, and four shares (i.e., 6,000) QPS to the fourth region.

After query rate allocations 220 are determined for the regions, scheduler 208 provides query rate allocations 220 to instances of rate limiter 204 during a potential DDoS attack, and rate limiter 204 uses query rate calculations 220 to calculate region sampling rates 224 that represent sampling rates for requests from individual regions. For example, rate limiter 204 calculates a sampling rate $r_i$ for region i using the following:

$$r_i = A_i/D_i,$$

where $A_i$ represents the QPS allocated to the region and $D_i$ represents the estimated QPS for the region. If the query rate allocation is higher than the estimated QPS for the region, rate limiter 204 forwards all requests from the region to downstream services and/or components of the online system. If the query rate allocation is lower than the estimated QPS, rate limiter 204 calculates the sampling rate as a value between 0 and 1 and blocks a random subset of requests from the region to maintain the sampling rate.

For example, rate limiter 204 calculates the sampling rate for a region with a query rate allocation of 9,000 QPS and an estimated 15,000 QPS to be 9,000/15,000, or 0.6. To enforce the sampling rate of 0.6, rate limiter 204 assigns a random number ranging from 1 to 5 to each request from the region and selects two of the numbers as representative of the 40% of requests from the region to block. When a request from the region is randomly assigned a number other than the selected numbers, the request is passed on to downstream services and/or components in the online system. When a request from the region is randomly assigned one of the selected numbers, the request is blocked or dropped.

In one or more embodiments, scheduler 208 and/or another component of the system include functionality to customize the sampling rate to individual IP addresses and/or IP subnets from which the traffic is received. More specifically, scheduler 208 calculates IP address rate limits 222 as upper bounds on QPSes from individual IP addresses and/or subnetworks based on proportions and/or volumes of historical member traffic 212 and/or guest traffic 214 received from the IP addresses and/or subnetworks.

For example, scheduler 208 calculates a rate limit for a given IP address (or subnetwork) using a function with the following representation:

$$q = f(n_1, n_2, \ldots, n_t)$$

In the above representation, q represents the rate limit for the IP address (or subnet), and $n_1, n_2, \ldots, n_t$ represent the number of members that have accessed the online system from the IP address over a sequence of t days. In turn, the sequence of numbers of members is inputted into function $f$ on day t+1 to calculate the rate limit for the IP address on that day.

In another example, scheduler 208 applies a machine learning model and/or function to the historical number of members that have accessed the online system from the IP address over a given period and a growth rate associated with the number of members that access the online system from the IP address to produce a value between 0 and 1 that represents the relative "importance" of the IP address to the online system. Scheduler 208 also combines the value with a maximum rate limit per IP address (e.g., 20 QPS) to produce a custom rate limit for the IP address. The custom rate limit ranges from 0 to the maximum rate limit and increases with the relative importance of the IP address.

In a third example, scheduler 208 identifies an IP address with a lack of historical member traffic 212 and/or guest traffic 214 to the online system. Because scheduler 208 lacks information related to historical traffic from the IP address to the online system, scheduler 208 assigns a default value (e.g., a value between 0 QPS and 1 QPS) to the rate limit until sufficient volumes and/or proportions of member traffic 212 and/or guest traffic 214 from the IP address can be established.

As with query rate allocations 220, rate limiter 204 obtains IP address rate limits 222 from scheduler 208 during a potential DDoS attack and uses IP address rate limits 222 to calculate IP address sampling rates 226 that represent sampling rates for requests from individual IP addresses. For example, rate limiter 204 determines a sampling rate for an IP address by dividing the rate limit for the IP address by an estimated QPS from the IP address. If the rate limit is higher than the estimated QPS, rate limiter 204 forwards all requests from the IP address to downstream services and/or components of the online system. If the rate limit is lower than the estimated QPS, rate limiter 204 calculates the sampling rate as a value between 0 and 1 and blocks a random subset of requests from the IP address to maintain the sampling rate.

Continuing with the above example, if the sampling rate for a given IP address is 0.75, rate limiter 204 assigns a random number ranging from 1 to 4 to each request from the IP address and selects one of the numbers as representative of 25% of requests from the IP address to block. When a request from the IP address is randomly assigned a number other than the selected number, the request is passed on to downstream services and/or components. When a request from the IP address is randomly assigned the selected number, the request is blocked or dropped.

After region sampling rates 224 and IP address sampling rates 226 are used by rate limiter 204 to block various portions of traffic from different regions and/or IP addresses, rate limiter 204, counter 206, and/or another component of the system track subsequent service QPSes 216 of individual services and/or total QPS 218 of the online system. In turn, scheduler 208 updates query rate allocations 220 and IP address rate limits 222 based on comparisons of service QPSes 216 and total QPS 218 to the corresponding query rate thresholds 210, and rate limiter 204 uses the updated query rate allocations 220 and IP address rate limits 222 to calculate and enforce corresponding region sampling rates 224 and IP address sampling rates 226. For example, scheduler 208 lowers query rate allocations 208 and/or IP address rate limits 222 when one or more service QPSes 216 and/or total QPS 218 exceed the corresponding query rate thresholds 210. Conversely, when the services and/or online system can support additional queries and certain regions and/or IP addresses have higher QPSes than currently allowed by the corresponding query rate allocations 208 and/or IP address rate limits 222, scheduler 208 selectively increases the QPS limits and/or allocations for the regions and/or IP addresses.

Traffic controller 202, rate limiter 204, and/or other components of the system continue processing and/or blocking traffic from different regions and/or IP addresses and updating the corresponding query rate allocations 220, IP address rate limits 222, region sampling rates 224, and/or IP address sampling rates 226 until the potential DDoS attack is determined to be over. For example, the system of FIG. 2 continues limiting and/or allocating QPSes to the regions and/or IP addresses until the total rate of blocked and allowed requests for all services and/or the online system fall below query rate thresholds 210.

By establishing rate limits for requests from different IP addresses based on historical proportions of the requests from members of the online system, the disclosed embodiments handle DDoS attacks by blocking higher proportions of requests from locations that historically lack trusted member traffic. Conversely, the disclosed embodiments selectively allow higher numbers of requests to be processed by the online system when the requests are from locations that historically have higher volumes of trusted member traffic. The disclosed embodiments thus manage DDoS attacks by keeping incoming requests below capacity limits for the online system and/or services executing in the online system while prioritizing requests that are more likely to come from trusted sources. In turn, malicious traffic is prevented from taking down the online system and/or services, and the online system is able to continue processing significant volumes of legitimate traffic during potential DDoS attacks.

In contrast, conventional techniques for mitigating DDoS attacks lack the ability to access encrypted data in higher layers of the network stack, such as identifiers, tokens, or other fields that can be used to distinguish between member traffic and non-member traffic to an online system. Instead, these techniques handle DDoS attacks based on information in lower layers (e.g., physical, data link, network, transport) of the network stack. As a result, these techniques are less capable of distinguishing malicious traffic from legitimate traffic during application-layer DDoS attacks, which reduces the effectiveness of the techniques and/or causes large volumes of legitimate traffic to be blocked. In turn, the DDoS attacks are more likely to bring down and/or disrupt legitimate traffic to systems that are guarded using conventional technique. Consequently, the disclosed embodiments improve computer systems, applications, tools, and/or technologies related to mitigating DDoS attacks, capacity monitoring, and/or managing or maintaining distributed services or systems.

Those skilled in the art will appreciate that the system of FIG. 2 may be implemented in a variety of ways. First, traffic controller 202, rate limiter 204, counter 206, scheduler 208, and data repository 234 may be provided by a single physical machine, multiple computer systems, one or more virtual machines, a grid, one or more databases, one or more filesystems, and/or a cloud computing system. Traffic controller 202, rate limiter 204, counter 206, and scheduler 208 may additionally be implemented together and/or separately by one or more hardware and/or software components and/or layers.

Second, traffic controller 202, rate limiter 204, counter 206, and/or scheduler 208 may be deployed in various components or parts of the online system. As mentioned above, traffic controller 202 may run in one or more fabrics of the online system, and instances of rate limiter 204 may execute in PoPs for the online system to block requests before the requests reach the fabric(s). Instances of rate limiter 204 may also, or instead, run in the fabric(s) to provide additional blocking or sampling of traffic to the online system and/or individual services in the online system after the traffic has reached the fabric(s).

Third, scheduler 208, rate limiter 204, and/or other components of the system include functionality to selectively use and/or combine region-based query rate allocations 220 and/or IP address rate limits 222 in mitigating DDoS attacks. For example, the system initially enforces query rate allocations 220 for requests from individual regions to the online system by dropping a subset of requests from each region with a QPS that exceeds the corresponding query rate allocation. After the requests have been sampled on the region level, the system additionally enforces IP address rate limits 222 for requests that were not blocked on the region level by dropping additional requests for each IP address with a QPS that exceeds the corresponding IP address rate limit. In another example, the system selectively and/or individually applies region-level query rate allocations 220 and IP address rate limits 222 to the requests, depending on the magnitude and/or severity of a potential DDoS attack on the online system.

Fourth, the system may use a number of techniques to calculate query rate allocations 220, IP address rate limits 222, region sampling rates 224, IP address sampling rates 226, query rate thresholds 210, and/or other values that are used to detect and/or mitigate DDoS attacks. For example, scheduler 208 includes functionality to account for trends, seasonality, and/or other patterns in historical member traffic 212 and/or guest traffic 214 during calculation of query rate allocations 220 and/or IP address rate limits 222 (e.g., using machine learning models, optimization techniques, formulas, etc.). As a result, query rate allocations 220 and/or IP address rate limits 222 may be higher during periods in which the corresponding regions and/or IP addresses typically experience higher volumes of member traffic 212 and lower during periods in which the corresponding regions and/or IP addresses typically experience lower volumes of member traffic 212. In another example, traffic controller 202, rate limiter 204, and/or other components of the system enforce certain ratios of member traffic 212 to guest traffic 214 for various regions and/or IP addresses during a potential DDoS attack (e.g., so ensure that a certain proportion of "trusted" or member traffic 212 is processed and/or a certain proportions of guest or "untrusted" traffic 214 is blocked). In a third example, components of the system include functionality to allocate or limit query rates for other groupings of requests (e.g., requests associated with particular devices, platforms, browsers, protocols, subnetworks, etc.).

Figure 3:
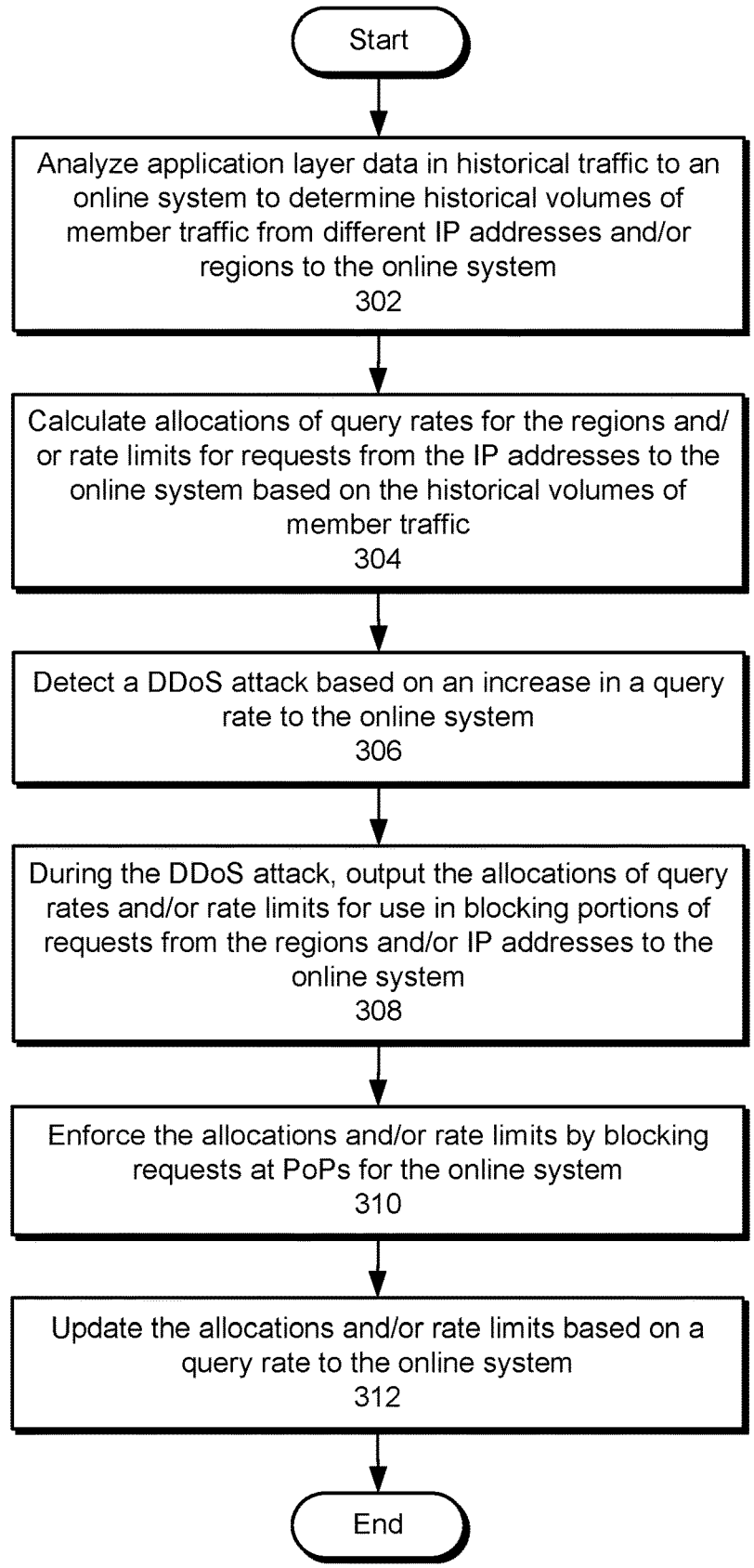
FIG. 3 shows a flowchart illustrating a process of managing traffic to an online system in accordance with the disclosed embodiments.

FIG. 3 shows a flowchart illustrating a process of managing traffic to an online system in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, application layer data in historical traffic to an online system is analyzed to determine historical volumes of member traffic from different IP addresses and/or regions to the online system (operation 302). For example, the application layer data includes member IDs, access tokens, and/or other attributes associated with registered members of the online system when the corresponding traffic originates from the registered members. Conversely, the application layer data lacks attributes associated with registered members of the online system when the corresponding traffic originates from non-registered users of the online system. In turn, member attributes in the application layer data are used to determine the volume of member traffic and/or the number of members accessing the online system from each IP address and/or region (e.g., country, ISP, AS, etc.). The member attributes are also, or instead, used to identify trends, seasonality, and/or patterns in the volume of member traffic and/or number of members accessing the online system from each IP address (or subnetwork) and/or region.

Next, allocations of query rates for the regions and/or rate limits for requests from the IP addresses to the online system are calculated based on the historical volumes of member traffic (operation 304). For example, QPS allocations for the regions are calculated to be proportional to the historical volumes of member traffic and/or numbers of members accessing the online system from the regions. The QPS allocations are optionally adjusted based on current QPSes and/or query rates for the set of regions, so that a region with a higher current QPS than a corresponding QPS allocation is given a slightly higher QPS allocation when the online system and/or services in the online system can support the higher QPS allocation.

In another example, an importance of an IP address is estimated as a value from 0 to 1 based on historical numbers of members accessing the online system from the IP address and a growth rate for the number of the members of the online system associated with the IP address. The estimated importance is then combined with a maximum rate limit for each IP address to produce a "custom" rate limit for requests from the IP address to the online system. Conversely, if the IP address lacks historical member traffic volumes and/or numbers, the rate limit is set to a default value (e.g., a low QPS limit) until information related to the volumes and/or proportions of member and/or non-member traffic from the IP address can be collected.

A DDoS attack is then detected based on an increase in a query rate to the online system (operation 306). For example, the query rate is estimated as a QPS for one or more services in the online system and/or a total QPS for the online system. A query rate threshold for the query rate is also determined based on attributes such as a resource utilization, SLA metric, and/or cost per request for the corresponding service(s) and/or the online system. The DDoS attack is then detected when an estimated QPS exceeds a corresponding query rate threshold.

During the DDoS attack, the allocations of query rates and/or rate limits are outputted for use in blocking portions of requests from the regions and/or IP addresses to the online system (operation 308), and the allocations and/or rate limits are enforced by blocking requests at PoPs for the online system (operation 310). For example, the query rate allocations and/or rate limits are provided to rate limiters executing in the PoPs. Each rate limiter determines a sampling rate for requests from a given region and/or IP address based on the corresponding query rate allocation and/or rate limit and an estimated query rate from the region and/or IP address. The rate limiter then selects a random subset of requests from the region and/or IP address to block based on the sampling rate.

Once blocking of requests has begun, the allocations and/or rate limits are updated based on a query rate to the online system (operation 312). For example, some or all allocations and/or rate limits are lowered if a QPS for unblocked requests remains higher than a corresponding query rate threshold. On the other hand, some or all allocations and/or rate limits are increased if a QPS for unblocked requests falls significantly below the corresponding query rate threshold after blocking of requests has begun. Such enforcing and/or adjusting of query rate allocations for regions and/or rate limits for IP addresses may continue until the DDoS attack is over. For example, a query rate is continuously calculated from the QPS for the online system and/or services in the online system and sampling rates for queries from the regions and/or IP addresses. When all query rates falls below query rate thresholds for the corresponding service(s) and/or the online system, the DDoS attack is determined to be over.

Figure 4:
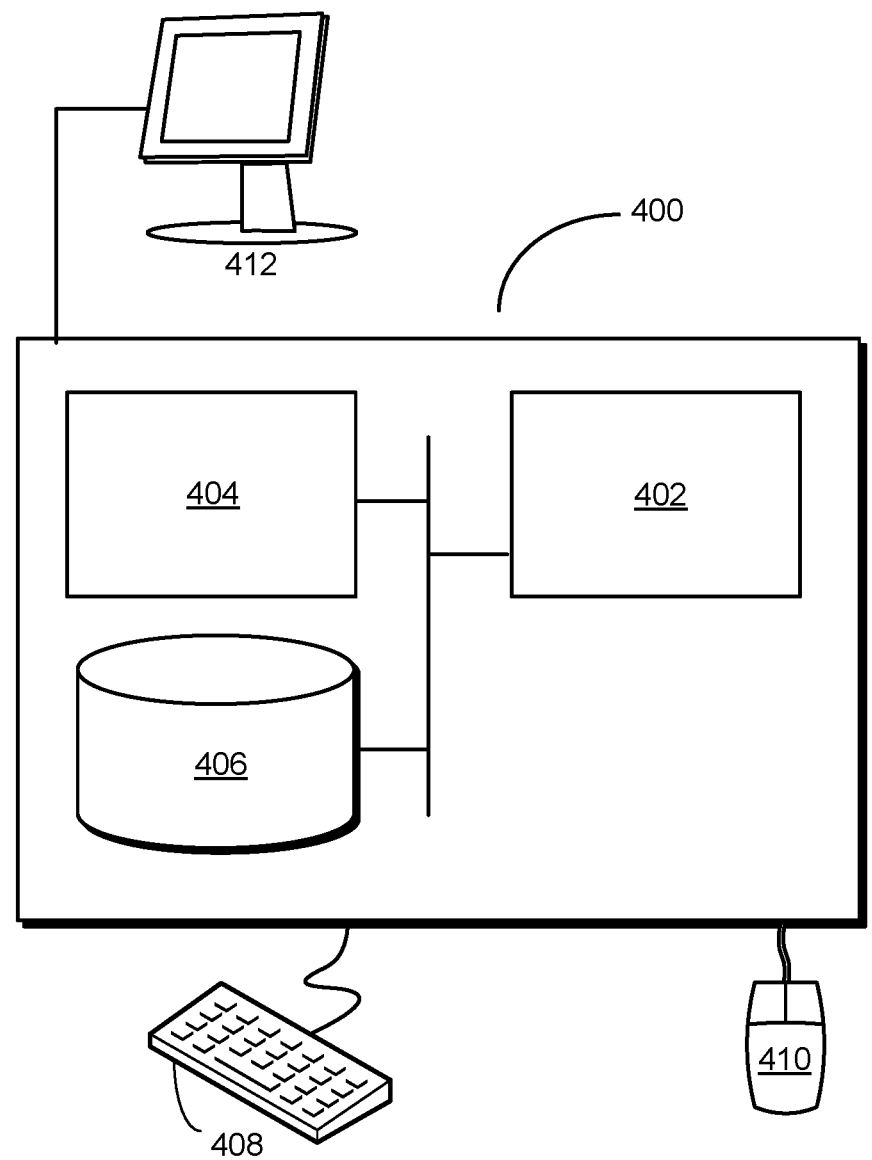
FIG. 4 shows a computer system in accordance with the disclosed embodiments.

FIG. 4 shows a computer system 400 in accordance with the disclosed embodiments. Computer system 400 includes a processor 402, memory 404, storage 406, and/or other components found in electronic computing devices. Processor 402 may support parallel processing and/or multi-threaded operation with other processors in computer system 400. Computer system 400 may also include input/output (I/O) devices such as a keyboard 408, a mouse 410, and a display 412.

Computer system 400 may include functionality to execute various components of the present embodiments. In particular, computer system 400 may include an operating system (not shown) that coordinates the use of hardware and software resources on computer system 400, as well as one or more applications that perform specialized tasks for the user. To perform tasks for the user, applications may obtain the use of hardware resources on computer system 400 from the operating system, as well as interact with the user through a hardware and/or software framework provided by the operating system.

In one or more embodiments, computer system 400 provides a system for mitigating DDoS attacks. The system includes a traffic controller and a rate limiter, one or more of which may alternatively be termed or implemented as a module, mechanism, or other type of system component. The traffic controller analyzes application layer data in historical traffic to an online system to determine a historical volume of member traffic from an IP address to the online system. Next, the traffic controller calculates a rate limit for a set of requests from the IP address to the online system based on the historical volume of member traffic from the IP address. During a DDoS attack, the traffic controller outputs the rate limit for use in blocking a subset of the requests from the IP address to the online system. Finally, the rate limiter enforces the rate limit by blocking the subset of the requests from the IP address at PoPs for the online system.

The traffic controller also, or instead, analyzes the application layer data the historical traffic to determine historical volumes of member traffic from a set of regions to the online system. Next, the traffic controller calculates allocations of query rates for the set of regions based on the historical volumes of member traffic from the set of regions. During a DDoS attack, the traffic controller outputs the allocations of the query rates for use in blocking different portions of the requests from different regions in the set of regions to the online system. Finally, the rate limiter enforces the rate limit by blocking different portions of requests from the regions at PoPs for the online system.

In addition, one or more components of computer system 400 may be remotely located and connected to the other components over a network. Portions of the present embodiments (e.g., traffic controller, rate limiter, counter, scheduler, data repository, fabrics, PoPs, online system, etc.) may also be located on different nodes of a distributed system that implements the embodiments. For example, the present embodiments may be implemented using a cloud computing system that detects and mitigates DDoS attacks on remote components of an online system.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor (including a dedicated or shared processor core) that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method comprising:
   analyzing, by one or more computer systems, application layer data in historical traffic to an online system to determine a historical volume of member traffic from an Internet Protocol (IP) address to the online system, wherein the member traffic is generated by members of the online system;
   calculating, by the one or more computer systems, a rate limit for a set of requests from the IP address to the online system based on the historical volume of member traffic from the IP address;
   wherein calculating the rate limit comprises estimating an importance of the IP address based on a number of the members of the online system associated with the historical volume of member traffic from the IP address and a growth rate for the number of the members of the online system associated with the IP address; and
   during a distributed denial-of-service (DDoS) attack, outputting the rate limit for use in blocking a subset of the set of requests from the IP address to the online system.

2. The method of claim 1, further comprising:
   detecting the distributed DDoS attack based on an increase in a query rate to the online system.

3. The method of claim 2, wherein detecting the distributed DDoS attack comprises:
   estimating the query rate as a queries per second (QPS) for one or more services in the online system; and
   detecting the distributed DDoS attack when the QPS exceeds a query rate threshold for the one or more services.

4. The method of claim 3, wherein detecting the distributed DDoS attack further comprises:
   determining the query rate threshold based on one or more attributes associated with the one or more services.

5. The method of claim 4, wherein the one or more attributes comprise at least one of:
   a resource utilization;
   a service level agreement metric; or
   a cost per request.

6. The method of claim 1, wherein calculating the rate limit for the set of requests from the IP address to the online system based on the historical volume of member traffic from the IP address further comprises:
   combining the estimated importance with a maximum rate limit to produce the rate limit for the set of requests from the IP address to the online system.

7. The method of claim 1, wherein calculating the rate limit for the set of requests from the IP address to the online system based on the historical volume of member traffic from the IP address comprises:
   updating the rate limit based on a query rate to the online system after the subset of the set of requests from the IP address to the online system have been blocked.

8. The method of claim 1, wherein calculating the rate limit for the set of requests from the IP address to the online system based on the historical volume of member traffic from the IP address comprises:
   when the IP address lacks the historical volume of requests from members of the online system, setting the rate limit to a default value.

9. The method of claim 1, further comprising:
   enforcing the rate limit by blocking the subset of the set of requests from the IP address at points of presence (PoPs) for the online system.

10. The method of claim 9, wherein blocking the subset of the set of requests from the IP address to the online system comprises:
    randomly selecting the subset of the set of requests from the IP address to the online system to block.

11. The method of claim 1, further comprising:
    analyzing, by the one or more computer systems, second application layer in second historical traffic to the online system to determine second historical volumes of second member traffic from a set of regions to the online system, wherein the second member traffic is generated by members of the online system;
    calculating, by the one or more computer systems, allocations of query rates for the set of regions based on the second historical volumes of second member traffic from the set of regions; and
    during a second DDoS attack, outputting the allocations of the query rates for use in blocking different portions of traffic, from different regions in the set of regions, to the online system.

12. A system comprising:
one or more processors; and
memory storing instructions that, when executed by the one or more processors, cause the system to:
analyze application layer data in historical traffic to an online system to determine a historical volume of member traffic from an Internet Protocol (IP) address to the online system, wherein the member traffic is generated by members of the online system;
calculate a rate limit for a set of requests from the IP address to the online system based on the historical volume of member traffic from the IP address;
wherein calculating the rate limit comprises estimating an importance of the IP address based on a number of the members of the online system associated with the historical volume of member traffic from the IP address and a growth rate for the number of the members of the online system associated with the IP address; and
during a distributed denial-of-service (DDoS) attack, output the rate limit for use in blocking a subset of the set of requests from the IP address to the online system.

13. The system of claim 12, wherein the memory further stores instructions that, when executed by the one or more processors, cause the system to:
detect the distributed DDoS attack based on an increase in a query rate to the online system.

14. The system of claim 13, wherein detecting the distributed DDoS attack comprises:
estimating the query rate as a queries per second (QPS) for one or more services in the online system;
determining a query rate threshold for the query rate based on one or more attributes associated with the one or more services; and
detecting the distributed DDoS attack when the QPS exceeds the query rate threshold for the one or more services.

15. The system of claim 14, wherein the one or more attributes comprise at least one of:
a resource utilization;
a service level agreement metric; or
a cost per request.

16. The system of claim 12, wherein calculating the rate limit for the set of requests from the IP address to the online system based on the historical volume of member traffic from the IP address comprises:
combining the estimated importance with a maximum rate limit to produce the rate limit for the set of requests from the IP address to the online system.

17. The system of claim 12, wherein calculating the rate limit for the set of requests from the IP address to the online system based on the historical volume of member traffic from the IP address comprises:
updating the rate limit based on a query rate to the online system after the subset of the set of requests from the IP address to the online system have been blocked.

18. The system of claim 12, wherein calculating the rate limit for the set of requests from the IP address to the online system based on the historical volume of member traffic from the IP address comprises:
when the IP address lacks the historical volume of requests from members of the online system, setting the rate limit to a default value.

19. The system of claim 12, wherein the memory further stores instructions that, when executed by the one or more processors, cause the system to:
enforce the rate limit by blocking the subset of the set of requests from the IP address at points of presence (PoPs) for the online system.

20. A non-transitory computer-readable storage medium storing instructions that, when executed by a computer, cause the computer to perform a method, the method comprising:
analyzing application layer data in historical traffic to an online system to determine a historical volume of member traffic from an Internet Protocol (IP) address to the online system, wherein the member traffic is generated by members of the online system;
calculating a rate limit for a set of requests from the IP address to the online system based on the historical volume of member traffic from the IP address;
wherein calculating the rate limit comprises estimating an importance of the IP address based on a number of the members of the online system associated with the historical volume of member traffic from the IP address and a growth rate for the number of the members of the online system associated with the IP address; and
during a distributed denial-of-service (DDoS) attack, outputting the rate limit for use in blocking a subset of the set of requests from the IP address to the online system.

* * * * *